(12) United States Patent
Jasek et al.

(10) Patent No.: US 12,229,310 B2
(45) Date of Patent: Feb. 18, 2025

(54) IDENTITY AND LICENSE VERIFICATION SYSTEM FOR WORKING WITH HIGHLY SENSITIVE DATA

(71) Applicants: Thomas Bata University in Zlin, Zlin (CZ); Viavis A.S., Vitkovice (CZ)

(72) Inventors: Roman Jasek, Zlin (CZ); Milan Oulehla, Brno Slatina (CZ); Petr Zacek, Zlin (CZ); Jan Krnavek, Zabreth (CZ); Vladimir Lazecky, Hradec nad Moravici (CZ); Jacek Makowski, Novy Bhoumin (CZ); Tomas Malik, Ostrava Petrkovice (CZ); Jiri Malik, Mikuluvka (CZ)

(73) Assignees: Thomas Bata University In Zlin, Zlin (CZ); Viavis A.S., Vitkovice (CZ)

( * ) Notice: Subject to any disclaimer, the term of this patent is extended or adjusted under 35 U.S.C. 154(b) by 229 days.

(21) Appl. No.: 17/762,164

(22) PCT Filed: Sep. 27, 2019

(86) PCT No.: PCT/CZ2019/050040
§ 371 (c)(1),
(2) Date: Mar. 21, 2022

(87) PCT Pub. No.: WO2021/058042
PCT Pub. Date: Apr. 1, 2021

(65) Prior Publication Data
US 2022/0374545 A1    Nov. 24, 2022

(30) Foreign Application Priority Data

Sep. 26, 2019  (CS) .................................. CZ2019-607

(51) Int. Cl.
*G06F 21/62* (2013.01)
*G06F 21/10* (2013.01)
*G06F 21/33* (2013.01)

(52) U.S. Cl.
CPC ........ *G06F 21/6245* (2013.01); *G06F 21/105* (2013.01); *G06F 21/33* (2013.01)

(58) Field of Classification Search
CPC ..... G06F 21/6245; G06F 21/105; G06F 21/33
See application file for complete search history.

(56) References Cited

U.S. PATENT DOCUMENTS

| 4,878,246 | A  | * | 10/1989 | Pastor | ...................... H04L 9/12 |
|           |    |   |         |        | 380/47 |
| 2015/0348027 | A1 | * | 12/2015 | Wei | ........................ G06Q 10/08 |
|           |    |   |         |        | 705/44 |

FOREIGN PATENT DOCUMENTS

| EP | 2101276 A1 | 9/2009 |
| JP | 2007325318 A | 12/2007 |

OTHER PUBLICATIONS

International Search Report and Written Opinion dated May 19, 2020 for related PCT Patent Application No. PCT/CZ2019/050040 which was filed on Sep. 27, 2019; 10 pages.

* cited by examiner

*Primary Examiner* — Bryan Y Lee
(74) *Attorney, Agent, or Firm* — Hovey Williams LLP; Paul J. Walker

(57) ABSTRACT

The system has a unique identifier (2) stored in client's hardware (1). Via a transfer environment (3) using a higher layer protocol (4), the unique identifier (2) is coupled to a server (5), where, in an evaluation module (6), it is connected to a substitution and calculation module (7). A w polynomial system (8) stored in the persistent memory (9) of the server (5) is also connected to the substitution and (Continued)

calculation module (7), the output of which is a calculated key (10). At the same time, the client's hardware (1) stores a local key (11) which is via the transfer environment (3) using the higher layer protocol (4) connected to a key comparison module (12) to which the calculated key (10) is also connected. The key comparison module (12) is through its positive output (13) and negative output (14) connected via the transfer environment (3) using the higher layer protocol (4) to a response processing module (15) which is stored in the client's hardware (1). The system, at high security levels, provides the required response speed even for a large number of users and/or licenses without significantly increasing the space/memory requirements of computing resources.

13 Claims, 7 Drawing Sheets

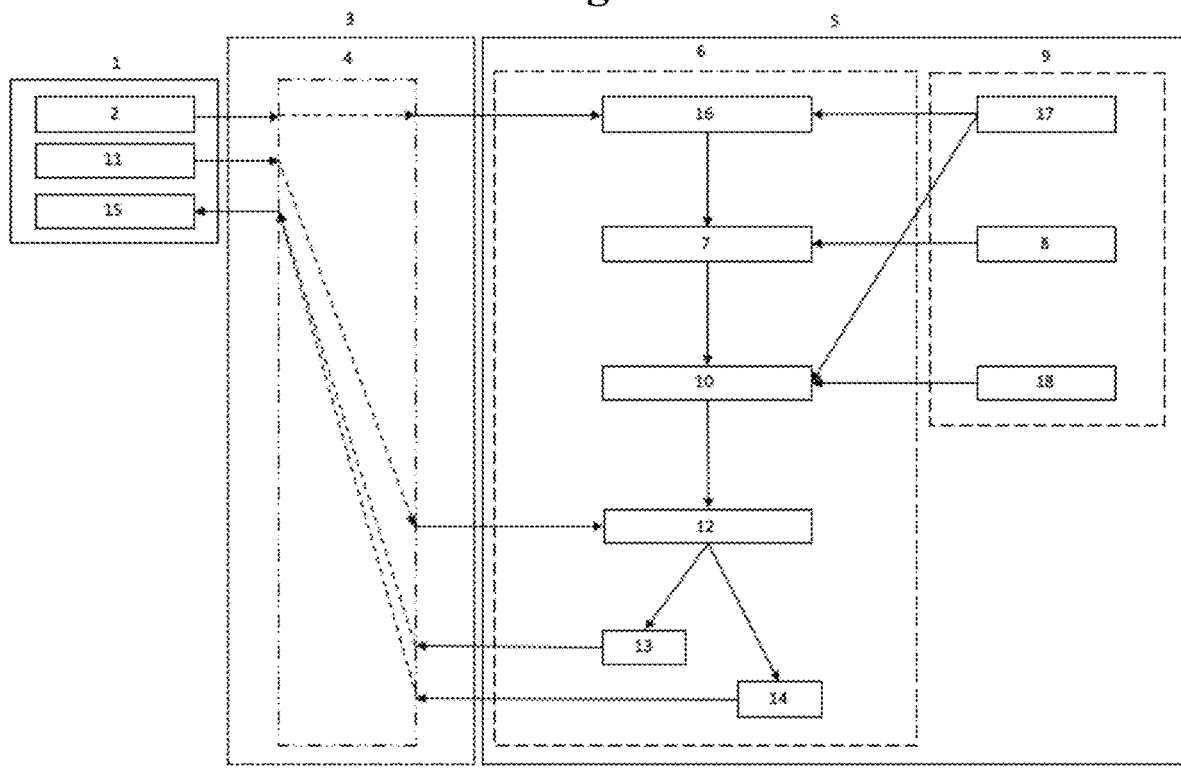

Fig. 4

Distribution of a polynomial (standard form) over a field $\mathbb{Z}_{1009}$:

IDENTITY AND LICENSE VERIFICATION SYSTEM FOR WORKING WITH HIGHLY SENSITIVE DATA

RELATED APPLICATIONS

This application is the National Stage of International Patent Application No. PCT/CZ2019/050040, filed Sep. 27, 2019, which is hereby incorporated herein by reference in its entirety, and which claims priority to Czech Patent Application No. PV 2019-607, filed Sep. 26, 2019, which is also incorporated herein by reference in its entirety.

FIELD OF INVENTION

The present invention relates to an identity and license verification system for accessing and working with highly sensitive data which is bound by selective or paid access. The proposed system is primarily designed for working with highly sensitive data such as military or police software, authorization of banking transactions, software licensing, building access security and other analogous applications.

BACKGROUND OF THE INVENTION

Used and known file protection, client authentication and licensing systems are based, e.g., on the Digital Signature Algorithm (DSA), qualified certificates and the like. These systems mostly use asymmetric cryptography methods utilizing a discrete logarithm or large number factorization. The use of polynomials in the standard form applies $$p_i(x) = q_{p-1}x^{p-1} + q_{p-2}x^{p-2} + \ldots + q_2x^2 + q_1x + q_0.$$

Standard polynomials are unsuitable for high p values (the number of users or licenses), given the fact that the number of terms, values of polynomial coefficients as well as the values of individual exponents grow rapidly. This greatly increases the demand for computing power and the response time required for comprehensive security. Another negative consequence of using polynomials of high degrees is the space complexity caused by the necessity to keep these polynomials in the persistent memory of computing resources.

There are two typical methods used to eliminate or reduce these problems. One of them is the effort to speed up the polynomial calculation using the so-called Horner's rule. While this solution leads to the partial acceleration of the authentication/authorization process, it does not eliminate the problem related to a large number of parameters.

The other suggested way to simplify and accelerate the verification process is to reduce the polynomial to a much lower degree. This allows to achieve the time and capacity improvement of the whole process but at the same time, there is a higher risk of unauthorized entry since the coefficients of such a reduced polynomial can be estimated, for example, by the Newton interpolation.

The task of this invention is to create the identity and license verification system for working with highly sensitive data that, at a high security level, provides the required response speed even for a large number of users and/or licenses (for high p values) without significantly increasing the space/memory requirements of computing resources.

SUMMARY OF THE INVENTION

The above mentioned disadvantages and drawbacks of well-known security systems are largely eliminated according to the invention—Identity and License Verification System for Working with Highly Sensitive Data. The principle of the invention is that the system has a unique identifier stored in the client's hardware; the said unique identifier is coupled to a server via the transfer environment using a higher layer protocol, the said unique identifier is in the evaluation module of the server further connected to the substitution and calculation module. At the same time, a w polynomial system stored in the persistent memory of the server is also connected to the substitution and calculation module, the output of which is a calculated key. At the same time, the client's hardware stores a local key which is via the transfer environment using the higher layer protocol connected to a key comparison module to which the calculated key is also connected. Positive output as well as negative output from the said key comparison module are both connected via the transfer environment using the higher layer protocol to a response processing module which is also stored in the client's hardware.

The advantage is that in the evaluation module, the identity and license verification system, according to the invention, has a search module in front of the substitution and calculation module. Furthermore, the x-mat matrix module, stored in the persistent memory of the server, is connected to the said search module together with the unique identifier. At the same time, the search module, together with the w polynomial system, is connected to the substitution and calculation module.

The advantage is that the identity and license verification system, according to the invention, has a ρ permutation stored in the persistent memory of the server, where both the ρ permutation and the x-mat matrix module are connected to the calculated key.

According to the invention, the main advantage of the Identity and License Verification System for Working with Highly Sensitive Data is the exceptional simplification of the calculation/processing of the user's input data and the associated very fast yet secure login to the protected highly sensitive data system. This is enabled by the character of the polynomial used here. Another consequence and significant benefit of the achieved lightening computation capacity of the security system is the possibility of virtually any increase in the number of users/licenses—even in millions—without any significant impact on the system response time. Moreover, the system security, according to the invention, is enhanced by the fact that the keys representing licenses are divided into two parts and the verification takes place remotely on the server. The security of the system is further enhanced by the fact that any attempt to tamper with one column of the matrix in the x-mat matrix module will result in blocking several other local keys.

BRIEF DESCRIPTION OF THE DRAWINGS

The accompanying drawings illustrate embodiments of the invention and, together with the description, serve to explain the principles of the invention.

FIG. 3—scheme of the system, according to Example 3—optimal embodiment,

FIG. 4—standard polynomial for p=1009 (attached in PDF format),

DETAILED DESCRIPTION OF THE INVENTION

Example 1

Figure 1:
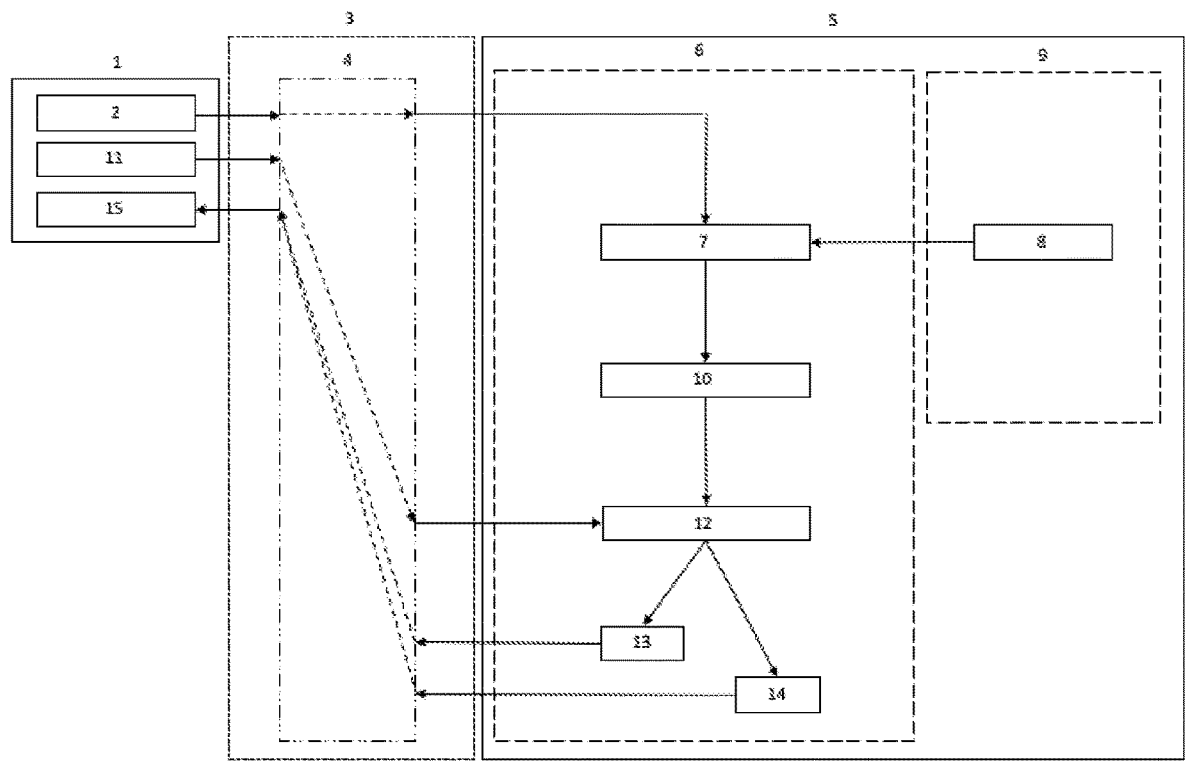
FIG. 1—scheme of the system, according to Example 1—basic embodiment.

The Identity and License Verification System for Working with Highly Sensitive Data, according to FIG. 1, has a unique identifier 2 stored in the client's hardware 1. Via the transfer environment 3 using a higher layer protocol 4, the unique identifier 2 is coupled to a server 5, where, in the evaluation module 6, it is connected to the substitution and calculation module 7. A w polynomial system 8 stored in the persistent memory 9 of the server 5 is also connected to the substitution and calculation module 7, the output of which is a calculated key 10. At the same time, the client's hardware 1 stores a local key 11 which is, via the transfer environment 3 using the higher layer protocol 4 connected to the key comparison module 12 to which the calculated key 10 is also connected. Positive output 13 as well as negative output 14 from the key comparison module 12 are both connected via the transfer environment 3 using the higher layer protocol 4 to a response processing module 15 which is also stored in the client's hardware 1.

The system works by sending the unique identifier 2 from the client's hardware 1, via the transfer environment 3 using the higher layer protocol 4 to the server 5, specifically to the evaluation module 6 which substitutes the transformed unique identifier 2 into the substitution and calculation module 7 as variables into the w polynomial system 8. Based on the results from the substitution and calculation module 7 (after the substitution into the w polynomial system 8), the calculated key 10 is created and then, in the key comparison module 12, compared with the local key 11 which is obtained from the client's hardware 1 through the transfer environment 3 using the higher layer protocol 4. In case that the calculated key 10 equals to the local key 11, positive output 13 is activated, otherwise the verification is rejected by negative output 14. The verification result obtained through positive output 13 or negative output 14 is passed, through the transfer environment 3 using the higher layer protocol 4, to the response processing module 15 stored in the client's hardware 1.

Without substantially increasing the space complexity requirements of the computing resources, the solution described in Example 1 provides a high response speed even for high p values (number of uses and/or licenses) in comparison to existing security systems. The use of finite fields, which will be described in more detail in the final part of Example 3, prevents fraudulent insertion of another user/license, which is a significant security feature of the proposed system.

Example 2

Figure 2:
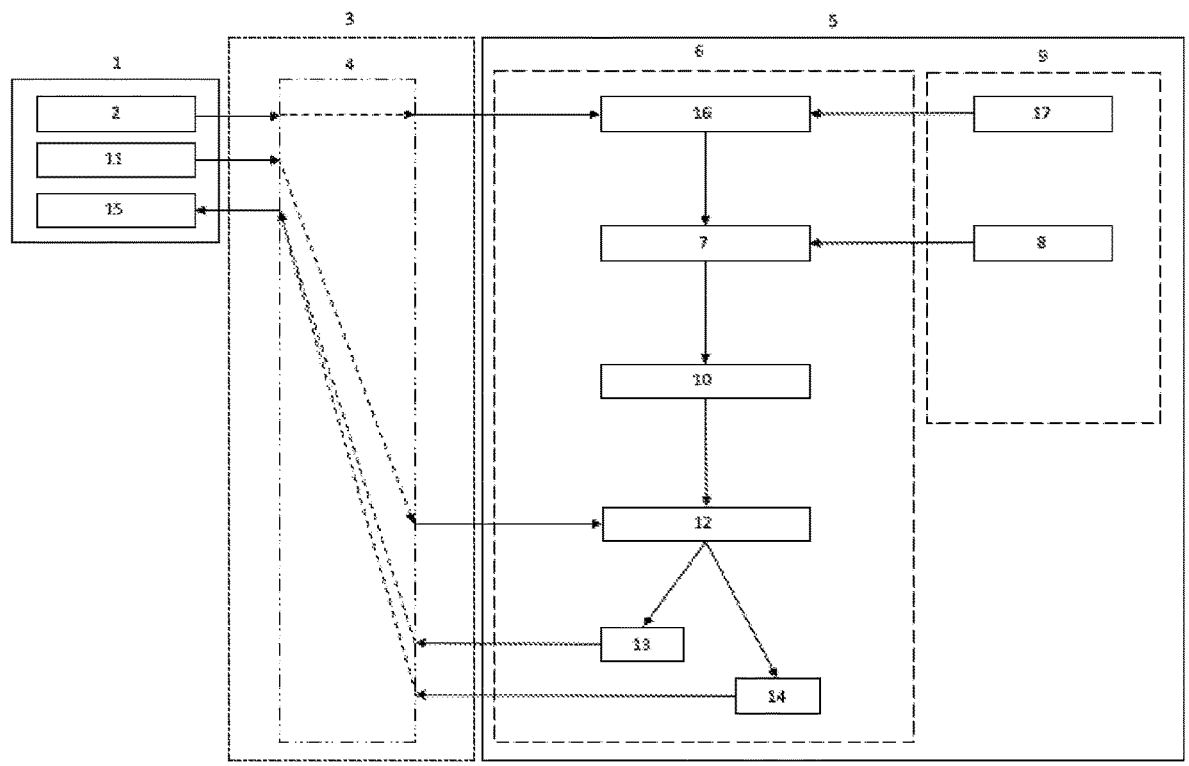
FIG. 2—scheme of the system, according to Example 2—preferred embodiment.

The Identity and License Verification System for Working with Highly Sensitive Data, according to FIG. 2, has the unique identifier 2, local key 11 and the response processing module 15 stored in the client's hardware 1. The server 5 again comprises the evaluation module 6 in which there is the substitution and calculation module 7 with output, i.e. the calculated key 10, connected to the key comparison module 12. The w polynomial system 8 stored in the persistent memory 9 of the server 5 is also connected to the substitution and calculation module 7. Then, the subsequent structure of its output links from the key comparison module 12 to the response processing module 15 is the same as in Example 1.

In addition, in the system, in the evaluation module 6, there is a search module 16 in front of the substitution and calculation module 7. The x-mat matrix module 17, stored in the persistent memory 9 of the server 5 is connected to the search module 16 together with the unique identifier 2. At the same time, the search module 16, together with the w polynomial system 8, is connected to the substitution and calculation module 7.

The system works by sending the unique identifier 2 from the client's hardware 1, via the transfer environment 3 using the higher layer protocol 4 to the search module 16 (of the evaluation module 6 of the server 5), which searches for the appropriate column in the x-mat matrix module 17. The found column is then substituted by the substitution and calculation module 7 as variables into the w polynomial system 8. Based on the results from the substitution and calculation module 7 (after the substitution into the w polynomial system 8), the calculated key 10 is created and then in the key comparison module 12, compared with the local key 11 which is obtained from the client's hardware 1 through the transfer environment 3 using the higher layer protocol 4. In case that the calculated key 10 equals to the local key 11, positive output 13 is activated, otherwise the verification is rejected by negative output 14. The verification result obtained through positive output 13 or negative output 14 is passed, through the transfer environment 3 using the higher layer protocol 4, to the response processing module 15 stored in the client's hardware 1.

Due to the inclusion of the x-mat matrix module 17, the transformed unique identifier 2 is not directly substituted into the evaluation module 6, but on the basis of the unique identifier 2, the appropriate column is searched in the x-mat matrix module 17 and subsequently substituted into the w polynomial system 8. This solution further increases the level of security without increasing the computational complexity.

Example 3

The Identity and License Verification System for Working with Highly Sensitive Data, according to FIG. 3 includes all parts set forth in Example 2 in the same configuration and with the same links. In addition, this system has a $\rho$ permutation 18 stored in the persistent memory 9 of the server 5. Both the $\rho$ permutation 18 and the x-mat matrix module 17 are connected to the calculated key 10.

The system works by sending the unique identifier 2 from the client's hardware 1, via the transfer environment 3 using the higher layer protocol 4 to the search module 16 (of the evaluation module 6 of the server 5), which searches for the appropriate column in the x-mat matrix module 17. The found column is then substituted by the substitution and calculation module 7 as variables into the w polynomial system 8. Based on the $\rho$ permutation 18 and results from the substitution and calculation module 7 (after the substitution into the w polynomial system 8), appropriate values are found in the x-mat matrix module 17, thus the values create the calculated key 10. In the key comparison module 12, the calculated key 10 is compared with the local key 11 which is obtained from the client's hardware 1 through the transfer environment 3 using the higher layer protocol 4. In case that the calculated key 10 equals to the local key 11, positive output 13 is activated, otherwise the verification is rejected by negative output 14. The verification result obtained through positive output 13 or negative output 14 is passed through the transfer environment 3 using the higher layer protocol 4 to the response processing module 15 stored in the client's hardware 1.

The above mentioned solution is the optimal implementation of the Identity and License Verification System for Working with Highly Sensitive Data. By utilizing the ρ permutation 18 simultaneously with the x-mat matrix module 17, this module is protected from malicious manipulation because unauthorized single column manipulation invalidates multiple local keys. This results in increased safety over the solution presented in Example 2.

According the invention, the identity and license verification systems for working with highly sensitive data use specifically designed polynomials for computation/validation operations, hereinafter called molded polynomials.

Molded polynomials are created by replacing the conventional q coefficients used in the standard polynomial by a set of a, b coefficients. The molded polynomials have a fundamentally different way/form of notation as well as calculation from the standard polynomials. The molded polynomial has fewer terms than a standard polynomial and its calculation has a constant number of cycles regardless of increasing p values (number of users and/or licenses), which significantly shortens and speeds up verification operations. When calculating molded polynomials, the system works with much more feasible values of coefficients and exponents and, especially with respect to exponents, it greatly reduces the computational complexity. This saves operation time and capacity of computing resources.

The stated effects in terms of speeding up/simplification of the calculation are more visible when there are larger numbers of users/licenses/subsystems involved in the system. The benefit is significant even at the value of p=37 and with increasing this number, the saving of working time and capacity grows exceptionally fast (see FIG. 5). At high p values, the saving is so extraordinary that the molded polynomials could be called "magic polynomials".

Example R (Reference)

To illustrate, an example of an existing security system for similar purposes, based on standard polynomials, is given $$p_i(x) = q_{p-1}x^{p-1} + q_{p-2}x^{p-2} + \ldots + q_2x^2 + q_1x + q_0.$$

The following are examples of standard polynomials for different p values.

Distribution of a polynomial (standard form) over a field $Z_{101}$:

$$p(x) = 25x^{100} + 73x^{99} + 92x^{98} + 48x^{97} + 83x^{96} + 100x^{95} +$$
$$75x^{94} + 83x^{93} + 17x^{91} + 93x^{90} + 30x^{89} + 74x^{88} + 40x^{87} +$$
$$25x^{86} + 38x^{85} + 78x^{84} + 73x^{83} + 69x^{82} + 91x^{81} + 4x^{80} +$$
$$84x^{79} + 4x^{78} + 61x^{77} + 98x^{76} + 19x^{75} + 100x^{74} + 91x^{73} +$$
$$5x^{72} + 69x^{71} + 36x^{70} + 91x^{69} + 76x^{68} + 81x^{67} + 53x^{66} +$$
$$81x^{65} + 91x^{64} + 82x^{63} + 86x^{62} + 87x^{61} + 59x^{60} + 3x^{59} +$$
$$38x^{58} + 94x^{57} + 84x^{56} + 57x^{55} + 20x^{54} + 97x^{53} + 31x^{52} +$$
$$21x^{51} + 30x^{50} + 11x^{49} + 93x^{48} + 26x^{47} + 70x^{46} + 26x^{45} +$$
$$19x^{44} + 73x^{43} + 99x^{42} + 52x^{41} + 19x^{40} + 80x^{39} + 55x^{38} +$$
$$51x^{37} + 22x^{36} + 41x^{35} + 75x^{34} + 28x^{33} + 19x^{32} + 17x^{31} +$$
$$95x^{30} + 32x^{29} + 91x^{28} + 64x^{27} + 79x^{26} + 13x^{25} + 86x^{24} +$$
$$45x^{23} + 26x^{22} + 42x^{21} + 87x^{20} + 23x^{19} + 52x^{18} + 3x^{17} +$$
$$6x^{16} + 87x^{15} + 78x^{14} + 89x^{13} + 44x^{12} + 45x^{11} + 16x^{10} +$$
$$38x^9 + 2x^8 + 25x^7 + 15x^6 + 7x^5 + 94x^4 + 15x^2 + 55x + 39$$

Distribution of a polynomial (standard form) over a field $Z_{311}$:

$$p(x) = 18x^{302} + 8x^{301} + 122x^{300} + 6x^{299} + 198x^{298} + 20x^{297} +$$
$$110x^{296} + 92x^{295} + 64x^{294} + 149x^{293} + 269x^{292} +$$
$$304x^{291} + 278x^{290} + 36x^{289} + 117x^{288} + 304x^{287} +$$
$$223x^{286} + 193x^{285} + 123x^{284} + 44x^{283} + 88x^{282} +$$
$$60x^{281} + 122x^{280} + 302x^{279} + 16x^{278} + 271x^{277} +$$
$$237x^{276} + 73x^{275} + 55x^{274} + 192x^{273} + 250x^{272} +$$
$$186x^{271} + 171x^{270} + 2x^{269} + 124x^{268} + 28x^{267} +$$
$$237x^{266} + 256x^{265} + 42x^{264} + 155x^{263} + 194x^{262} +$$
$$176x^{261} + 145x^{260} + 189x^{259} + 51x^{258} + 208x^{257} +$$
$$216x^{256} + 124x^{255} + 308x^{254} + 119x^{253} + 190x^{252} +$$
$$196x^{251} + 130x^{250} + 292x^{249} + 244x^{248} + 278x^{247} +$$
$$132x^{246} + 59x^{245} + 168x^{244} + 175x^{243} + 238x^{242} +$$
$$178x^{241} + 235x^{240} + 58x^{239} + 226x^{238} + 267x^{237} +$$
$$104x^{236} + 29x^{235} + 161x^{234} + 291x^{233} + 162x^{232} +$$
$$231x^{231} + 123x^{230} + 15x^{229} + 49x^{228} + 92x^{227} +$$
$$307x^{226} + 47x^{225} + 60x^{224} + 257x^{223} + 97x^{222} +$$
$$38x^{221} + 139x^{220} + 6x^{219} + 68x^{218} + 142x^{217} +$$
$$114x^{216} + 145x^{215} + 171x^{214} + 22x^{213} + 93x^{212} +$$
$$11x^{211} + 216x^{210} + 68x^{209} + 147x^{208} + 269x^{207} +$$
$$43x^{206} + 261x^{205} + 82x^{204} + 64x^{203} + 203x^{202} +$$
$$287x^{201} + 207x^{200} + 38x^{199} + 158x^{198} + 56x^{197} +$$
$$162x^{196} + 103x^{195} + 217x^{194} + 108x^{193} + 308x^{192} +$$
$$230x^{191} + 278x^{190} + 114x^{189} + 131x^{188} + 169x^{187} +$$
$$87x^{186} + 50x^{185} + 232x^{184} + 88x^{183} + 166x^{182} +$$
$$182x^{180} + 291x^{178} + 157x^{177} + 234x^{176} + 299x^{175} +$$
$$118x^{174} + 58x^{173} + 283x^{172} + 20x^{171} + 208x^{170} +$$
$$175x^{169} + 165x^{168} + 157x^{167} + 190x^{166} + 96x^{165} +$$
$$43x^{164} + 36x^{163} + 41x^{162} + 153x^{161} + 151x^{160} +$$
$$173x^{159} + 190x^{158} + 291x^{157} + 294x^{156} + 58x^{155} +$$
$$217x^{154} + 128x^{153} + 178x^{152} + 174x^{151} + 88x^{150} +$$
$$96x^{149} + 172x^{148} + 122x^{147} + 189x^{146} + 113x^{145} +$$
$$113x^{144} + 48x^{143} + 282x^{142} + 310x^{141} + 241x^{140} +$$
$$245x^{139} + 186x^{138} + 57x^{137} + 174x^{136} + 178x^{135} +$$
$$78x^{134} + 151x^{133} + 125x^{132} + 26x^{131} + 37x^{130} +$$
$$46x^{129} + 243x^{128} + 95x^{127} + 146x^{126} + 237x^{125} +$$
$$223x^{124} + 14x^{123} + 153x^{122} + 282x^{121} + 170x^{120} +$$
$$237x^{119} + 128x^{118} + 33x^{117} + 31x^{116} + 144x^{115} +$$
$$37x^{114} + 177x^{113} + 195x^{112} + 181x^{110} + 206x^{109} +$$
$$225x^{108} + 81x^{107} + 128x^{106} + 173x^{105} + 310x^{104} +$$
$$94x^{103} + 197x^{102} + 160x^{101} + 75x^{100} + 243x^{99} + 18x^{98} +$$
$$108x^{97} + 27x^{96} + 126x^{95} + 191x^{94} + 89x^{93} + 62x^{92} +$$
$$37x^{91} + 133x^{90} + 9x^{89} + 95x^{88} + 157x^{87} + 100x^{86} +$$
$$273x^{85} + 164x^{84} + 276x^{83} + 147x^{82} + 125x^{81} + 6x^{80} +$$
$$191x^{79} + 159x^{78} + 205x^{77} + 111x^{76} + 143x^{75} + 34x^{74} +$$
$$210x^{73} + 78x^{72} + 141x^{71} + x^{70} + 26x^{69} + 252x^{68} +$$
$$138x^{67} + 66x^{66} + 142x^{65} + 161x^{64} + 44x^{63} + 240x^{62} +$$
$$187x^{61} + 53x^{60} + 281x^{59} + 125x^{58} + 118x^{57} + 263x^{56} +$$
$$237x^{55} + 241x^{54} + 304x^{53} + 109x^{52} + 17x^{51} + 271x^{50} +$$
$$53x^{49} + 30x^{48} + 267x^{47} + 77x^{46} + 165x^{45} + 106x^{44} +$$
$$39x^{43} + 248x^{42} + 273x^{41} + 172x^{40} + 231x^{39} + 217x^{38} +$$
$$247x^{37} + 156x^{36} + 302x^{35} + 286x^{34} + 31x^{33} + 56x^{32} +$$
$$201x^{31} + 211x^{30} + 230x^{29} + 186x^{28} + 187x^{27} + 204x^{26} +$$
$$229x^{25} + 137x^{24} + 11x^{23} + 171x^{22} + 221x^{21} + 109x^{20} +$$
$$28x^{19} + 239x^{18} + 194x^{17} + 243x^{16} + 299x^{15} + 91x^{14} +$$
$$99x^{13} + 257x^{12} + 32x^{11} + 8x^{10} + 109x^9 + 250x^8 + 217x^7 +$$
$$142x^6 + 183x^5 + 90x^4 + 269x^3 + 189x^2 + 153x + 198$$

Figure 4:
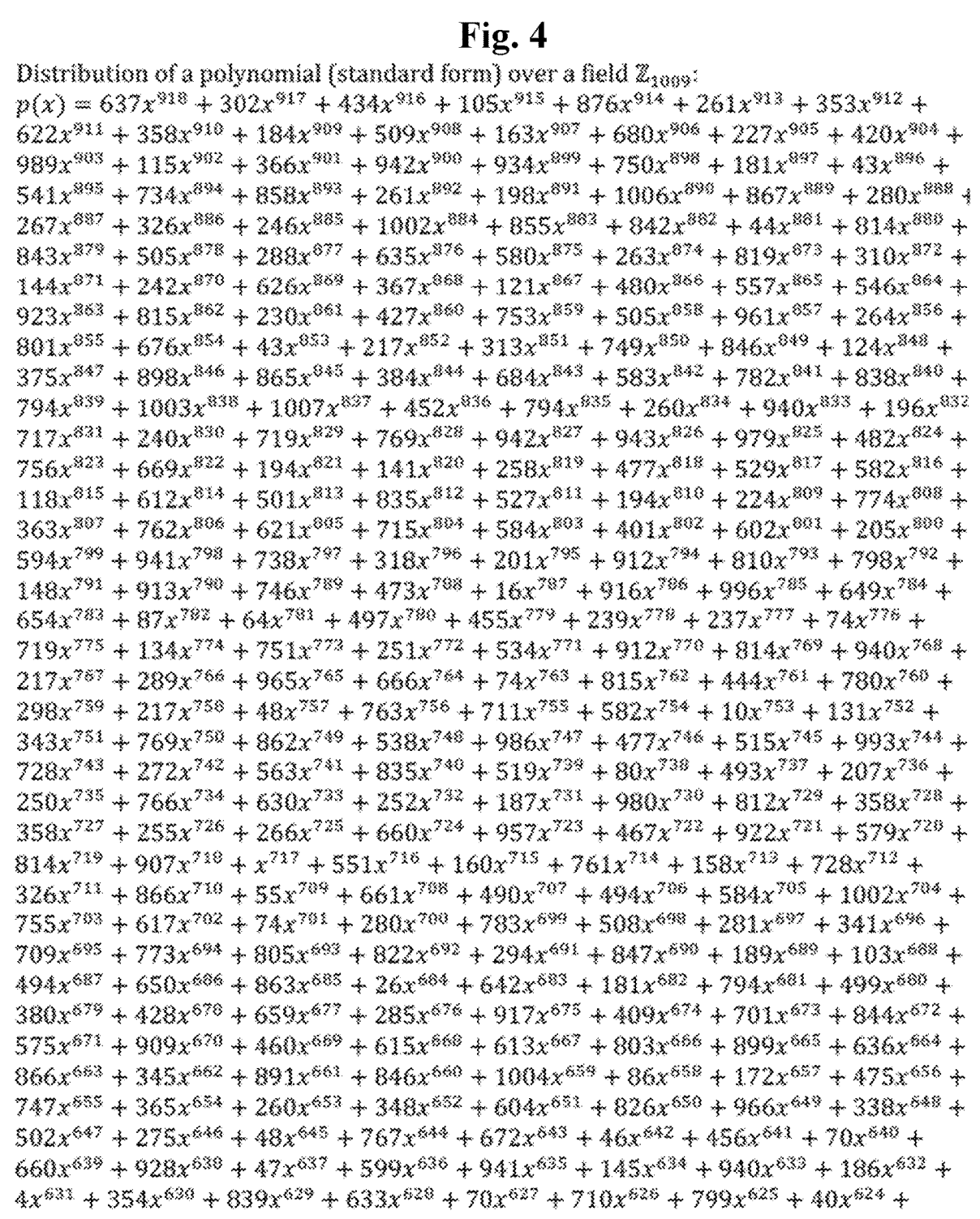
Figure 4:
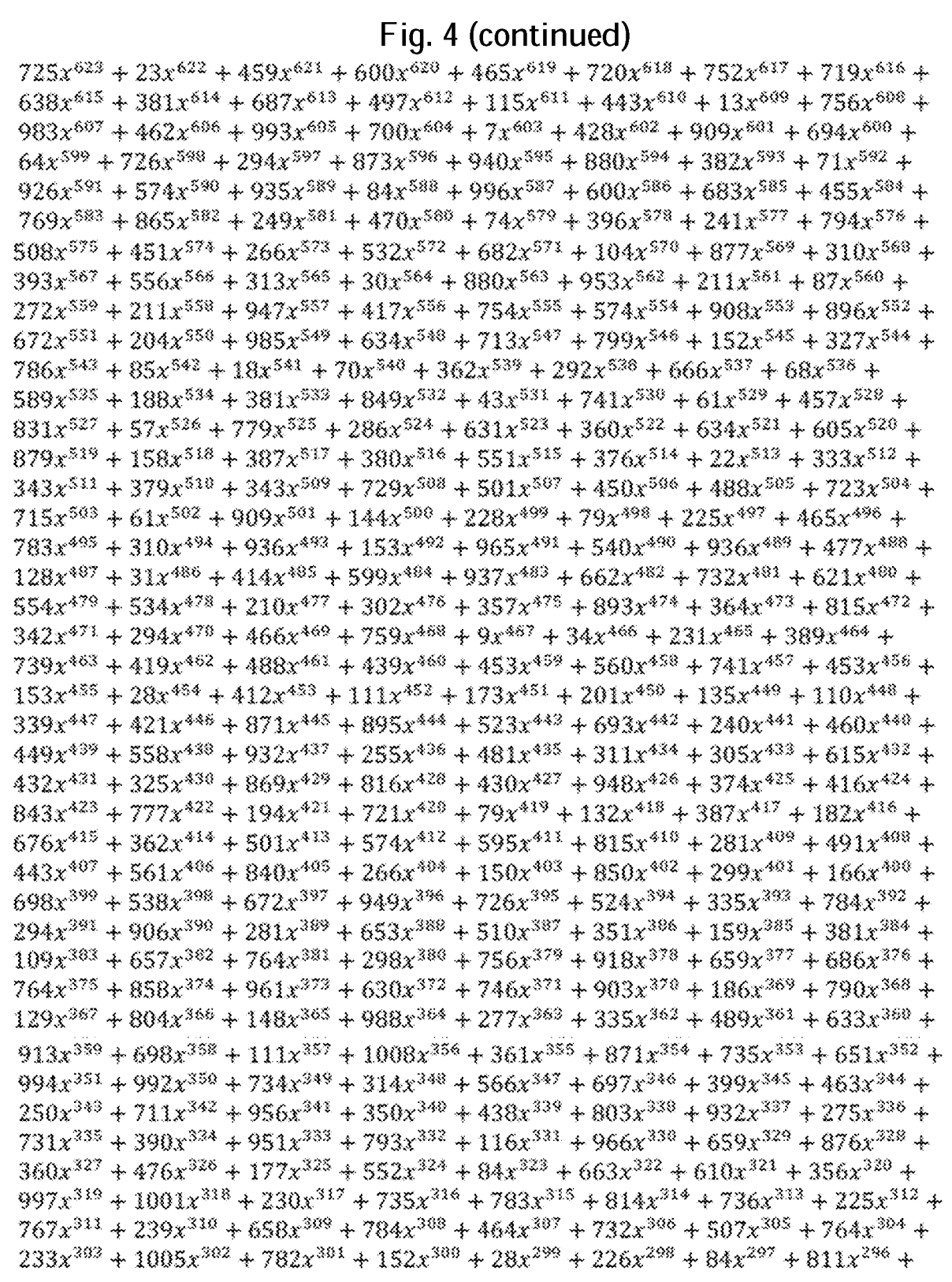

Distribution of a polynomial (standard form) over a field $Z_{1009}$ is due to its size listed separately as an attachment in PDF format—see FIG. 4. The figure, illustrating the complexity of the expression, shows the difficulty of calculating the value of a standard polynomial both in terms of computing resources and the impact of complexity on computation speed and system response.

Figure 5:
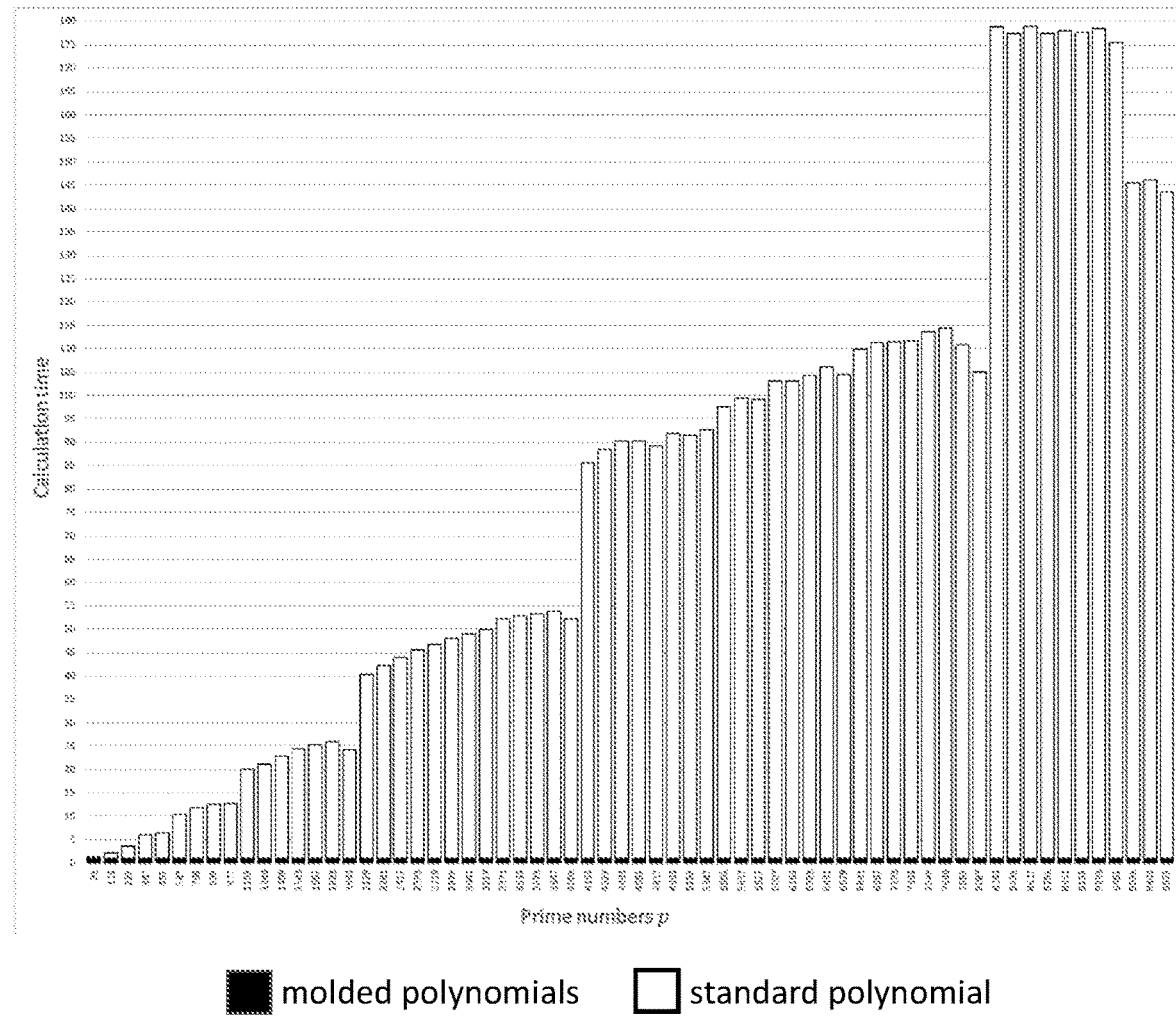
FIG. 5—visual comparison of computational complexity of the system according to Example 3 and Example R, FIG. 6—a graphical representation of the relationship between bit security and p prime number size.

In contrast to standard polynomials with the aforementioned problems and drawbacks, the use of molded polynomials in the system according to the invention allows fast calculations that have a constant number of cycles even for a large number of users, licenses and subsystems. FIG. 5 shows a comparison between the computational complexity of the molded polynomial values (Example 3) and standard polynomials (Example S). The graph illustrates the response time saving as well as the capacity improvement of computing resources, especially at higher p values.

Despite the calculation speed, the security of the system according to the invention remains at a high level. From a security point of view, it is beneficial that the server keys for a user/license/subsystem are represented by columns in the x-mat matrix module 17 stored on the server 5, where the calculated key 10, in case of use of ρ permutation 18, is not a direct result of calculating the individual molded polynomials, but it is then searched for in the x-mat matrix module 17. Neither polynomial results nor calculated keys 10 can be stored on the server 5. Thus, it is difficult to derive the x-mat matrix module 17 from polynomials and local keys 11, if they were stolen.

Figure 6:
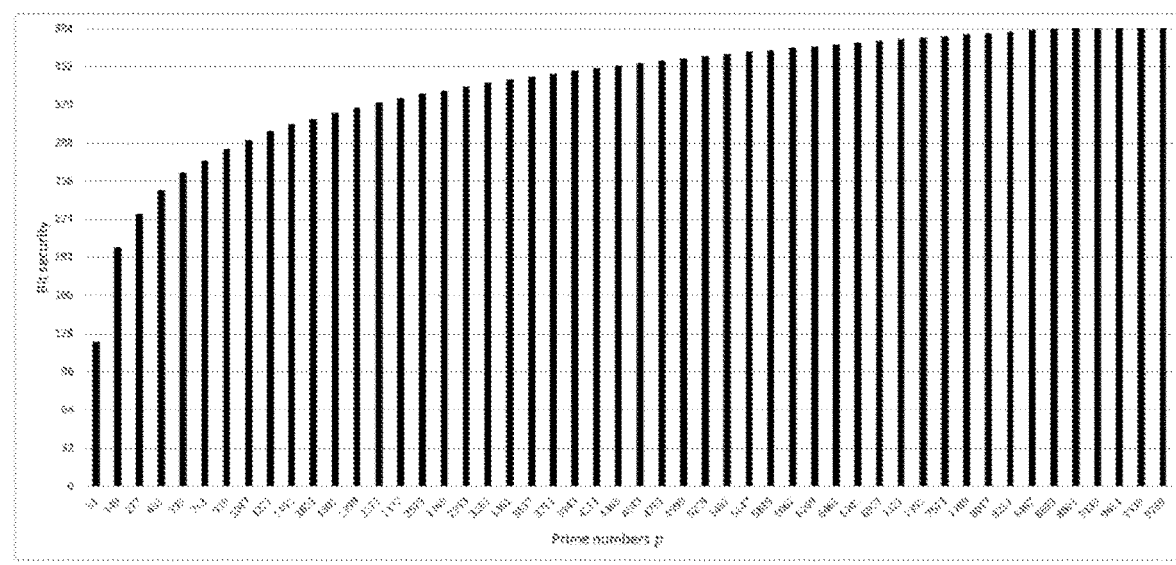

The security of the system according to the invention is shown in the FIG. 6, which illustrates the relation between bit security and the prime number p values. Expression of bit security means a conservative estimate of the number of molded polynomials with respect to the selected prime p, where bit security is calculated from the assumption of using a brute force attack and thus trying all different combinations. For a 128-bit key, this is $2^{128}$ combinations; if a prime number p=31 is chosen, then the number of different molded polynomials is comparable to the number of 121-bit key combinations, i.e. approximately $2^{121}$. In the security of symmetric cryptography, 128-bit keys can be considered safe, to which p=31 merely approaches. However, the next prime number 37 exceeds this value, it has a bit security of 131 bits. If the prime number 10007 is taken into account, bit security can be compared to 390 bits. This value can currently be considered safe with respect to the existence of quantum computers, where halving bit security is considered. Moreover, it is to be understood that bit security is related only to the individual molded polynomials, not to the entire w polynomial system 8 that the system according to the invention operates with and which is in its preferred variants safer.

INDUSTRIAL APPLICABILITY

The Identity and License Verification System for Working with Highly Sensitive Data, according to the invention, is intended for generating and verifying unique license or identification keys used for software licenses validation or unique identification of users, elements of the Internet of Things, use of systems related to decision-making power in military or banking sector. Thus, the system will find application especially for the verification of users of electronic data systems with extremely high security needs and at the same time very fast response times, such as systems for military purposes, security forces, integrated rescue system and other related areas. However, it can also be used in civilian applications, such as building access security, but also for common purposes like entrance tickets, public transportation tickets and other similar applications.

LIST OF NUMBERED PARTS IN FIGURES

1—client's hardware
2—unique identifier
3—transfer environment
4—higher layer protocol
5—server
6—evaluation module
7—substitution and calculation module
8—w polynomial system
9—persistent memory (of server)
10—calculated key
11—local key
12—key comparison module
13—positive output (of key comparison module)
14—negative output (of key comparison module)
15—response processing module
16—search module
17—x-mat matrix module
18—ρ permutation

The invention claimed is:

1. An identity and license verification system for accessing and working with an electronic set of highly sensitive data, comprising:
a client access hardware device with a unique identifier and a local key stored thereon, wherein the client access hardware device is connected, via a transfer environment, to a server;
wherein the client access hardware device is configured to transmit the unique identifier via the transfer environment using a higher layer protocol to the server;
wherein a system of w polynomials is stored in a persistent memory of the server;
wherein the server is configured to output a calculated key based upon the unique identifier and the system of w polynomials;
wherein the local key is previously determined based on the unique identifier and the system of w polynomials;
wherein the client access hardware device is configured to transmit the local key via the transfer environment using the higher layer protocol to the server; and
wherein the server is configured to receive the local key after determining the calculated key and transmit a positive output or a negative output based on a comparison of the local key and the calculated key via the transfer environment using the higher layer protocol to the client access hardware device.

2. The identity and user license verification system according to claim 1, wherein an x-mat matrix is stored in the persistent memory of the server; and wherein the server is configured to retrieve an input from a column in the x-mat matrix, and use the input to determine the calculated key.

3. The identity and user license verification system according to claim 2, wherein a ρ permutation is stored in the persistent memory of the server, wherein the server is configured to determine the calculated key based at least upon the ρ permutation.

4. The identity and user license verification system according to claim 1, wherein the system of w polynomials comprises molded polynomials.

5. The identity and user license verification system according to claim 1, wherein the client access hardware device is configured to transmit the local key separately from the unique identifier.

6. The identity and user license verification system according to claim 1, wherein the server is configured to receive the local key after determining the calculated key.

7. The identity and user license verification system according to claim 1, wherein the sever is configured to determine the calculated key by using the unique identifier as variables in the system of w polynomials.

8. The identity and user license verification system according to claim 1, wherein the calculated key is not stored on the persistent memory of the server.

9. A method of verifying a client hardware device, the method comprising:
receiving, at a server using a higher layer protocol, a unique identifier stored on the client hardware device;
determining, via the server, a calculated key based at least upon the unique identifier and a system of w polynomials stored on a persistent memory of the server;
receiving, at the server using the higher layer protocol, a local key from the client hardware device, wherein the local key was previously determined using the system of w polynomials;
comparing, via the server, the local key and the calculated key; and transmitting, via the server using the higher layer protocol, a positive output if the local key is identical to the calculated key.

10. The method of claim 9, further comprising transmitting, via the server using the higher layer protocol, a negative output if the local key is different than the calculated key.

11. A method of verifying a client hardware device, the method comprising:
- receiving at a server, via a higher layer protocol of a transfer environment, a unique identifier stored on the client hardware device;
- retrieving, via the server, an input from a column corresponding to the unique identifier in an x-mat matrix stored on a persistent memory of the server;
- determining, via the server, a calculated key based at least upon the input and a system of w polynomials stored on the persistent memory of the server;
- receiving, via the higher layer protocol of the transfer environment, a local key stored on the client hardware device, wherein the local key was previously determined using at least the system of w polynomials and the input;
- comparing, via the server, the local key and the calculated key; and
- transmitting, via the higher layer protocol of the transfer environment, a positive output if the local key is identical to the calculated key.

12. The method of claim 11, wherein the local key and the calculated key are determined based further on a $\rho$ permutation stored in the persistent memory of the server.

13. The method of claim 11, further comprising transmitting, via the higher layer protocol of the transfer environment, a negative output if the local key is different than the calculated key.

* * * * *